United States Patent [19]

Aoshima et al.

[11] 4,446,746
[45] May 8, 1984

[54] TORQUE DETECTING APPARATUS

[75] Inventors: Shozo Aoshima; Noboru Hirose; Michio Ishikawa, all of Nagoya, Japan

[73] Assignee: Brother Kogyo Kabushiki Kaisha, Nagoya, Japan

[21] Appl. No.: 310,410

[22] Filed: Oct. 9, 1981

[30] Foreign Application Priority Data

Oct. 29, 1980 [JP] Japan .................................. 55-151645

[51] Int. Cl.³ ............................ G01L 3/12; G01L 3/14
[52] U.S. Cl. ................................. 73/862.33; 250/231 R
[58] Field of Search ................ 73/862.33, 862.34, 650; 250/231 SE, 231 R

[56] References Cited

U.S. PATENT DOCUMENTS

| | | | |
|---|---|---|---|
| 2,519,378 | 8/1950 | Kilpatrick | 73/862.33 X |
| 2,938,378 | 5/1960 | Canapa et al. | 73/862.33 |
| 3,234,655 | 2/1966 | Skeels et al. | 250/231 SE X |
| 3,329,012 | 7/1967 | Demuth | 73/862.33 |
| 3,495,452 | 2/1970 | Johnson et al. | 73/862.33 |
| 3,975,954 | 8/1976 | Barnich | 73/862.33 |
| 4,193,720 | 3/1980 | Machida | 408/6 |

Primary Examiner—Gerald Goldberg
Assistant Examiner—John E. Chapman, Jr.
Attorney, Agent, or Firm—Browdy & Neimark

[57] ABSTRACT

An apparatus for detecting torque transmitted between two rotary members. A driving member and a driven member are connected via a transmission spring, permitting relative angular displacement therebetween. On either one of the two rotary members a wheel disk having a number of slits arranged in a circle is provided. A detector, such as a photocoupler, for detecting the slits is disposed on a frame adjacent to the wheel disk. A shutter disk with a shutter portion for partially covering the slits is attached to the other rotary member at an opposed posture to the wheel disk. The number of slits detected by the detector is varied according to the relative angular displacement between the driving member and the driven member while they are in rotation, and the torque between both rotary members may be numerically determined from the number of slits detected.

14 Claims, 5 Drawing Figures

TORQUE DETECTING APPARATUS

BACKGROUND OF THE INVENTION

This invention relates to a torque detecting apparatus. More particularly, it relates to a torque detecting apparatus for numerically detecting the torque transmitted between a driving member and a driven member, that is, an amount of angular displacement produced between the two members when both are rotatingly linked with a transmitting means which is so disposed between the two members as to permit relative angular displacement. This invention also relates to an apparatus for detecting relative angular displacement between two rotary members.

In the apparatus of prior art U.S. Pat. No. 4,193,720, the torque between the two members is detected, as disclosed in the specification and drawings thereof, while the driving member and the driven member are rotated via a flexible driving connection. In this apparatus, the driving member is provided with a reaction rod which is integrally rotatable therewith and also axially movable. On one end of the reaction rod and on the corresponding end of the driven member cam surfaces are respectively disposed so as to be mutually engaged due to spring force applied on the reaction rod. When the driven member is placed under a load exceeding a predetermined amount, some angular displacement takes place between the driven member and the driving member, which will cause the reaction rod to be axially moved against the spring force due to the action between the cam surfaces. The torque between both members can be measured in this apparatus by detecting the amount of shift of the reaction rod.

As the reaction rod is axially shifted in this prior art apparatus through the action between the two cam surfaces formed on the driven member and the reaction rod, the detected value is liable to be varied according to the lubrication status of the cam surfaces, and moreover the detected value may possibly go wrong due to the easy axial shifting of the reaction rod caused by variation of the slant angle between the cam surfaces when they have been worn, which will inevitably vary the detected value.

Other prior art devices are known from TOKU-KO-SHO Nos. 53(1978)-22474 and 54(1979)-6101 published in Japan.

According to the disclosure in TOKU-KO-SHO No. 53(1978)-22474, the driving shaft and the driven shaft are each provided with a magnet, and proximity switches are disposed in the circumference thereof. A load torque applied to the driven shaft can be detected by measuring the phase difference of the pulse signals generated from both proximity switches, i.e., the magnitude of the relative angular displacement between both magnets which is proportional to the magnitude of the torque. As a base or reference for setting the predetermined load torque, i.e., the maximum allowable phase difference, a mono-stable multivibrator, which is able to keep for a certain time (maximum phase difference) an ON state in response to activation of the proximity switch on the driving shaft side, is used. In a time constant circuit determining the ON time for the multivibrator, setting of an exact time is quite difficult, and exact load torque detection is therefore next to impossible. Detection of a lesser load torque value which has been lowered from a certain level is difficult in this prior art. After all, simple and exact detection of the torque has not been established so far. It is also impossible in this prior art apparatus which makes use of the phase difference to detect the varying status and the value of the torque on the driven shaft while it is in rotation at each moment.

In the disclosures of TOKU-KO-SHO No. 54(1979)-6101 the value of load torque to be detected is set in advance. For detecting various predetermined load torques, the mounting condition of detected or detecting members must be altered case by case. Just like in the above-mentioned prior art device, detection of a small amount of torque and variation of the torque can not be made satisfactorily in this prior art apparatus.

SUMMARY OF THE INVENTION

It is therefore a primary object of this invention to provide an apparatus for precisely detecting torque transmitted between two rotary members.

It is another object of the invention to provide an apparatus for numerically detecting the torque.

It is another object of the invention to provide an apparatus which can be used for the detection of small amounts of torque.

It is another object of the invention to provide an apparatus for detecting variation of the torque.

It is another object of the invention to provide a torque detecting apparatus which is excellent in durability and simple in structure.

It is another object of the invention to provide an apparatus for warning of an overload torque or of a too small torque.

It is a further object of the invention to provide an apparatus for detecting relative angular displacement between two members rotating about a common axis.

A preferred embodiment of this invention comprises transmitting means so interposed between the driving rotary member and the driven rotary member as to allow relative angular displacement between them in a range of less than 360 degrees. A wheel disk is disposed on either one of the two rotary members with a number of detectable or signal portions (preferably slits) arranged in a circle, a detecting means is disposed on a frame opposite to the wheel disk for detecting the detectable portions, a shutter disk is disposed on the other rotary member and has a shutter portion for partially covering the signal portions such that one end of the shutter portion is moved with respect to a predetermined one of the detectable portions, and processing means are provided for counting the number of the detectable portions between the one end of the shutter portion and the predetermined one detectable portion during one rotation of the rotary members.

Rotation of the driving member causes by way of the transmitting means the driven member to be rotated, and some relative angular displacement will take place between the two members according to the load applied. The angular displacement makes the predetermined one signal portion and the one end of the shutter portion either mutually approach towards or separate away from each other. By detecting the number of the signal portions appearing between the two during one rotation of the members, the relative angular displacement therebetween can be numerically detected.

The invention torque detecting apparatus is excellent as to durability because it has no frictional engaging parts in the detection means. It is also excellent in precisely detecting the variation of torque between the two rotary members as well as numerically detecting the torque because of the capability of detecting the torque for each single rotation of the rotary members. In this way the amount of torque can be continuously and exactly detected in apparatus according to this invention.

The apparatus for detecting the relative angular displacement provided for a torque detecting device is also applicable to devices other than torque detecting apparatus.

DETAILED DESCRIPTION OF A PREFERRED EMBODIMENT

An embodiment of this invention shown as a torque detecting apparatus will be described herein with reference to the accompanying drawings.

Figure 1:
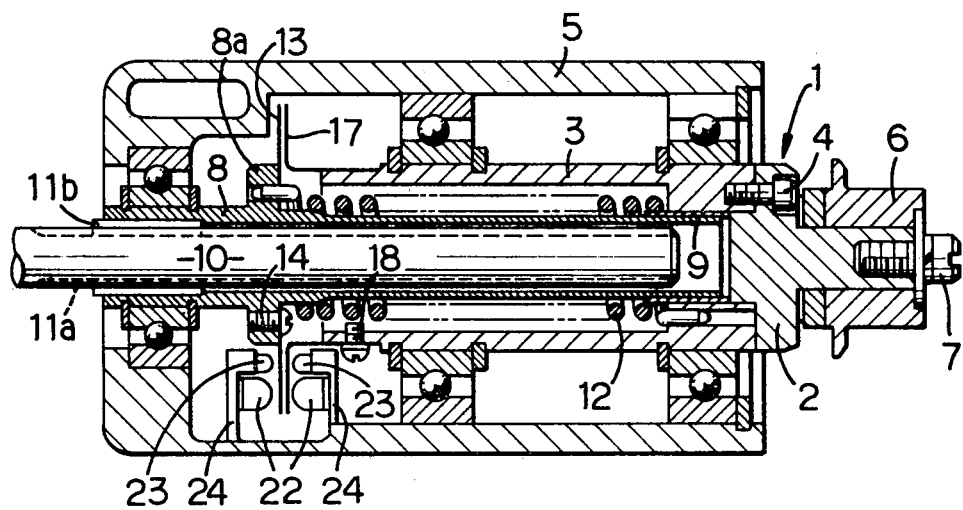
FIG. 1 is an axial sectional view of a torque detecting apparatus according to the invention.
Figure 4:
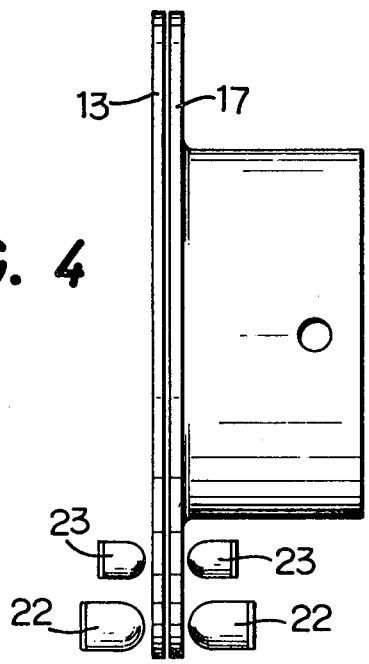
FIG. 4 is a side view showing the arrangement of photocouplers relative to the wheel disk and the shutter disk.

In FIG. 1, a driving shaft 1 comprises a shaft portion 2 and a cylindrical sleeve portion 3 coupled and fixed together by a bolt 4 and rotatably supported by a case 5. A pulley 6 is secured by a bolt 7 to the shaft portion 2 of the driving shaft 1 and it transmits the rotation of a motor or other drive means to the driving shaft 1 through a belt or the like (not shown).

A driven sleeve 8 is supported at its base end portion rotatably in the case 5 and it is disposed on the same axis as the driving shaft 1. At its end portion the driven sleeve 8 is supported for relative rotation within the driving shaft 1 through a slide ring 9. To one end portion (not shown) of a driven shaft 10 there is affixed a tool such as a drill, and the other end portion of the driven shaft 10 is inserted in and connected to the driven sleeve 8 with a spline 11a and a spline key 11b so as to be integrally rotatable and relatively movable in the axial direction with respect to the driven sleeve 8. A transmission coil spring 12 designed as a rotation transmitting means is concentrically wound about the driven sleeve 8 with a radial clearance therebetween. One end of spring 2 is fixed to sleeve portion 3 and the other end thereof is fixed to a flange portion 8a of the driven sleeve 8, thereby transmitting the rotational force of the driving shaft 1 to the driven sleeve 8. When a large load torque has been applied to the driven shaft 10 and the driving shaft 1 has been displaced by an angle of 360 degrees (one rotation) in the rotational direction with respect to the driven sleeve 8, the transmission spring 12 is twisted and wound closely about and into engagement with the outer peripheral surface of the driven sleeve 8.

Figure 2:
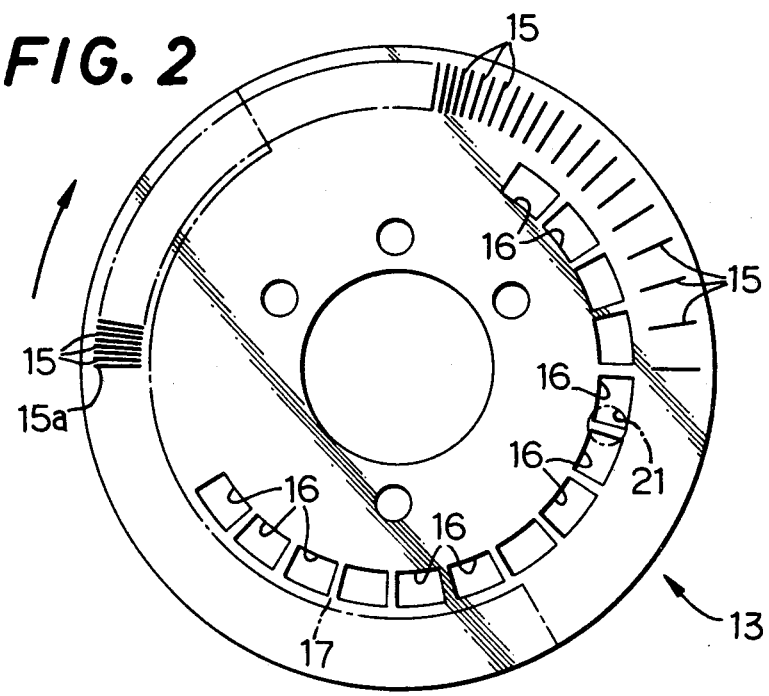
FIG. 2 is a front view of a wheel disk used in the apparatus.

A wheel disk 13 is fixed with a screw 14 to the flange portion 8a of the driven sleeve 8 and it rotates together with the driven sleeve 8. In this embodiment, as shown in FIG. 2, a total of eighty-nine slits 15, which function as signal or detectable means through which relative angular displacement may be detected, are formed in a radially outer portion of the wheel disk 13. The slits 15 start at a position 15a and extend in the direction of rotation so that they are spaced from each other in a circle concentric with the axis of the driven sleeve 8. The initial seventy-one slits 15 are disposed at equiangular intervals of 1.5 degrees and the subsequent slits are disposed at exponentially increasing intervals. From a position displaced by an angle of about 131 degrees in the rotational direction of the wheel disk 13 with respect to starting position 15a of the slits 15, there are formed a total of 14 sector through holes 16 spaced from each other on another circle also concentric to the axis of the driven sleeve 8 and radially inwardly of the slits 15.

Figure 3:
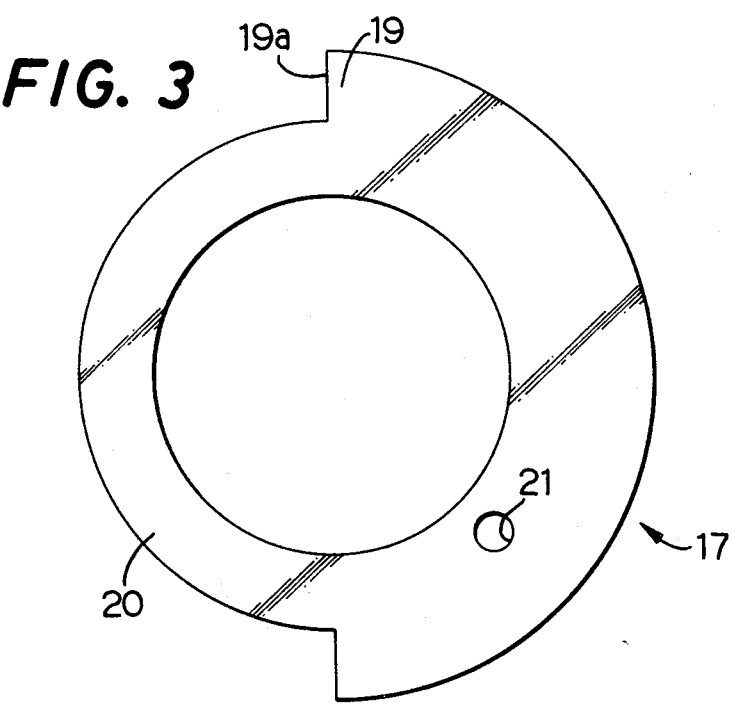
FIG. 3 is a front view of a shutter disk used in the apparatus.

A shutter disk 17 is fixed with a screw 18 to the inner end portion of the sleeve portion 3 of the driving shaft 1 in opposed relation to the wheel disk 13 to rotate together with the driving shaft 1. In this embodiment, as shown in FIG. 3, the shutter disk 17 has a slit shutter portion 19 for shutting the adjacent slits 15 when opposed to the wheel disk 13, an annular through hole shutter portion 20 for shutting the through holes 16, and a reference hole 21 formed in the portion 20 to be aligned with the through holes 16. The slit shutter portion 19 is a sector projection extending radially outwardly from the periphery of the annular through hole shutter portion 20. The shutter disk 17 is disposed so as to assume a relative position as indicated by the one-dot-chain line in FIG. 2 (the position wherein the 33rd and subsequent consecutive slits 15 are shut by the slit shutter portion 19 in this embodiment) with respect to the wheel disk 13 when the driving shaft 1 is stopped. As clearly shown by this composite illustration in FIG. 2, the slits 15 are disposed along about half the circumference of the circle in which they are located on disk 13. The shutter portion 20 of disk 17 is defined by end lines 19a which are diametrically opposite each other and positioned radially of the locus circle of the slits 15.

An angular displacement detecting photocoupler 22 and a resetting photocoupler 23 are disposed in the case 5 each on a supporting member 24. The angular displacement detecting photocoupler 22 detects the passing of the slits 15 in the wheel disk 13 and the resetting photocoupler 23 detects the passing of the reference hole 21 of the shutter disk 17. Even if the reference hole 21 passes the resetting photocoupler 23 in a state indicated with the one-dot-chain line in FIG. 2 with respect to the through holes 16, a photodiode of the photocoupler 23 can detect the light emitted from the light emitting diode thereof.

When the driving shaft 1 is rotated by means of a motor or other drive means and the driven shaft 10 is thereby rotated in an unloaded state, the shutter disk 17 undergoes a slight relative angular displacement in the rotational direction relative to the wheel disk 13 by virtue of the resilience of the transmission spring 12, thus causing one radial edge portion 19a of the slit shutter portion 19 and the slit 15a of the wheel disk 13 to move relatively apart from each other (by an angle corresponding to eight slits in this embodiment). After the relative angular motion has reached equilibrium, the disk 17 is rotating at the same rotational speed as the wheel disk 13 without producing a relative angular displacement. In this state, therefore, the angular displacement detecting photocoupler 22 detects the passing of forty (32+8) slits 15 for every one rotation of the rotary disk 13, and outputs forty pulse signals SG1 equal to the number of the slits 15 passed.

Next, when a load is applied to the driven shaft 10, the shutter disk 17 undergoes a relative angular displacement in the rotational direction with respect to the wheel disk 13 in proportion to the magnitude of the load torque applied. This causes a number ($\alpha$) of slits 15 corresponding to that angular displacement to come out of the coverage of the slit shutter portion 19 of the shutter disk 17 to be exposed. Consequently, for every one rotation of the wheel disk 13, the angular displacement detecting photocoupler 22 detects the passing of the slits 15 by a number ($40+\alpha$) including such an additional number ($\alpha$) and outputs the pulse signal SG1 by the number equal to the number ($40+\alpha$) of the slits 15 detected.

Along with the relative angular displacement of the shutter disk 17, the reference hole 21 is also displaced. Thus, before the angular displacement detecting photocoupler 22 detects the passing of the slits 15 at every rotation of the shutter disk 17, the resetting photocoupler 23 detects the passing of the reference hole 21 and outputs a reset pulse signal SG2.

Therefore, the load torque of the driven shaft 10 can be detected correctly on the basis of the total number of the pulse signals SG1 provided from the angular displacement detecting photocoupler 22 every time the driven shaft 10 rotates once.

The slits 15 formed in the wheel disk 13 are disposed so that a predetermined number of the slits are arranged at equal intervals and the subsequent slits 15 are arranged at exponentially increasing intervals. Therefore, within a range where the torque is large, the sensitivity of the apparatus is naturally lowered, so that the invention device is able to detect a wide range of torques.

Figure 5:
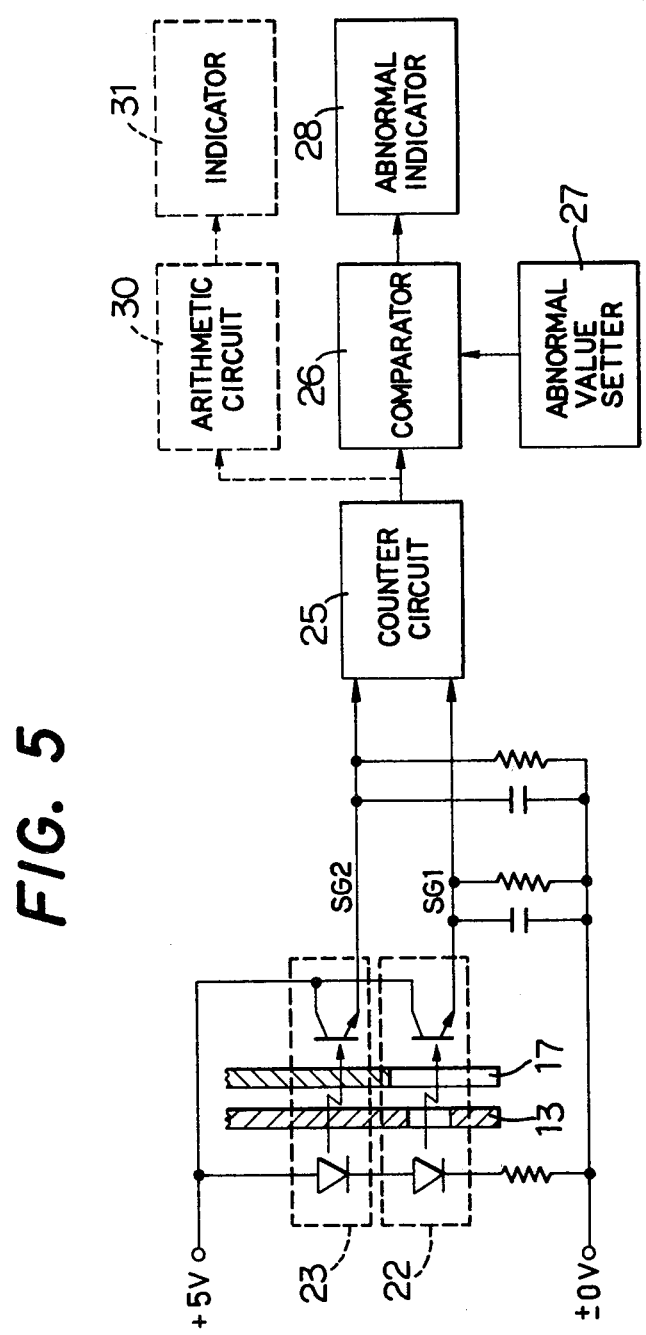
FIG. 5 is a partially electrical schematic and partially block circuit diagram of a circuit used in the apparatus.

The following description, see FIG. 5, concerns the apparatus for detecting a load torque of the driven shaft 10 on the basis of the pulse signal SG1 provided from the angular displacement photocoupler 22 and for detecting an abnormal load torque.

A counter circuit 25, which is an addition counter, adds the number of the pulse signals SG1 every time a signal is input from the angular displacement detecting photocoupler 22, and outputs its counted contents to a comparator 26 of the next stage. The counter circuit 25 clears its counted contents upon input of the reset pulse signal SG2 from the resetting photocoupler 23. Therefore, every time the wheel disk 13 or the driven shaft 10 rotates once, the counter circuit 25 counts the pulse signals SG1 and outputs its counted contents to the comparator 26. That is, the total number of the pulse signals SG1 counted by the counter circuit 25 at every rotation of the driven shaft 10 indicates a load torque value (Tx) for each rotation of the driven shaft 10, and this load torque value (Tx) is input to the comparator 26.

An abnormal value setter 27 sets an upper limit torque, e.g., the maximum allowable value (Tmax) of a load torque applied to the driven shaft 10 and it outputs the maximum allowable torque value (Tmax) in a coded form to the comparator 26 so that this torque value (Tmax) may be compared in the comparator 26 with the actual load torque value (Tx) which is input from the counter circuit 25.

The comparator 26 compares the load torque value (Tx) from the counter circuit 25 with the maximum allowable load torque valve (Tmax) from the abnormal value setter 27, and when the load torque value (Tx) has become coincident with or greater than the maximum allowable load torque value (Tmax), the comparator 26 outputs a signal to an abnormal indicator 28. The abnormal indicator 28 comprises a pilot lamp which lights up in response to the aforesaid abnormal condition signal thereby indicating that an abnormal torque is being applied to the driven shaft 10.

In this embodiment an abnormal signal from the comparator 26 is output to the abnormal indicator 28, but this abnormal signal may be used as a control signal for stopping the operation of drive means such as a motor which drives the driving shaft 1. Moreover, if the abnormal value setter 27 is made capable of setting a lower limit torque, e.g., the minimum allowable load torque value in place of the maximum allowable load torque value and at the same time if the comparator 26 is adapted to output an abnormal signal when the load torque value (Tx) has fallen and has reached the aforesaid minimum allowable load torque value, then it becomes possible to detect that the load of the driven shaft 10 has become light.

Furthermore, as indicated by the dash lines the circuit could be designed so that the counted contents of the counter circuit 25 are output to an arithmetic circuit 30, in which the increment corresponding to the load torque applied to the driven shaft 10 from its unloaded state is calculated on the basis of such counted contents, and variations in load torque are indicated by an indicator 31 in the next stage for each rotation or at every predetermined number of rotations of the drive members.

The wheel disk 13 may be mounted on the driving shaft 1, while the shutter disk 17 may be mounted on the driven sleeve 8. Moreover, although the slits 15 are formed in the wheel disk 13 and the reference hole 16 is formed in the shutter disk 17 in the above embodiment, both plates 13 and 17 may be formed of a transparent material and black or opaque marks may be attached to the portions corresponding to the slits 15 and the reference hole 16 to serve as the signal or detector means.

It is also possible to substitute, in place of the combination of the slits 15 and the photocoupler 22, a combination of a magnetic piece disposed on a non-magnetic disk and a proximity switch, or a plurality of permanent magnets and a Hall element. In the case of the latter combination the shutter disk should be made of a magnetic material.

Furthermore, the transmission spring 12 may be replaced by a torsion bar or a rotation transmitting mechanism using a magnetic force.

While the invention has been described in detail above, it is to be understood that this detailed description is by way of example only, and the protection granted is to be limited only within the spirit of the invention and the scope of the following claims.

What is claimed is:

1. An apparatus for detecting torque transmitted between a driving rotary member and a driven rotary member mounted on a frame for rotation about a common axis, comprising:
   transmitting means, disposed between said driving and driven rotary members, for transmitting rotary motion from said driving rotary member to said driven rotary member, said transmitting means permitting said rotary members to produce a relative angular displacement with respect to each other in proportion to the magnitude of a load applied to said driven rotary member, said angular displacement being held within a range less than 360 degrees;

a wheel disk attached to one of said driving and driven rotary members and having a plurality of detectable portions spaced from each other along a circle concentric with said axis;

first detecting means, disposed on said frame adjacent to said wheel disk, for detecting said detectable portions of said wheel disk and generating detecting signals corresponding to said detectable portions detected during rotation of said driving rotary member;

a shutter disk attached to the other of said rotary members adjacent to said wheel disk and having a single shutter portion formed thereon so as to cover a partial circumference of said circle, said shutter portion selectively covering consecutive ones of said detectable portions and thereby preventing said first detecting means from detecting the consecutive detectable portions covered by said shutter portion, said shutter portion being movable relative to a specific one of said detectable portions in response to said relative angular displacement and thereby changing the number of the detectable portions which are exposed with respect to said shutter portion to be detected by said first detecting means;

second detecting means, disposed on said frame opposite to said wheel and shutter disks, for detecting a resetting portion formed in one of said wheel and shutter disks, said second detecting means generating a resetting signal in each rotation of said wheel and shutter disks when said resetting portion is detected; and processing means connected to said first and second detecting means and comprising a counter for counting the number of said detecting signals generated from said first detecting means to detect the number of the exposed detectable portions, said counter being reset by said resetting signal, whereby said relative angular displacement is detected in each rotation of said rotary members.

2. An apparatus for detecting torque according to claim 1, wherein said transmitting means comprises a coil spring disposed between said rotary members.

3. An apparatus for detecting torque according to claim 2, wherein said coil spring has opposite ends connected with said rotary members respectively and a middle portion which is wound about one of said rotary members such that a radial clearance is left between said middle portion and the external surface of said one of the rotary members until said middle portion engages said external surface when said relative angular displacement exceeds a predetermined value within said angular range.

4. An apparatus for detecting torque according to claim 1, wherein said detectable portions comprise a plurality of slits formed in said wheel disk, said first detecting means comprising a first photo sensing device disposed on said frame for detecting said slits and generating one pulse signal every time when the same detects each one of said slits.

5. An apparatus for detecting torque according to claim 4, wherein said second detecting means is a second photo sensing device, said resetting portion being a first through-hole formed through said shutter disk to be detected by said second photo sensing device, and said wheel disk having at least one second through-hole through which said first through-hole is detected by said second photo sensing device.

6. An apparatus for detecting torque according to claim 5, wherein said shutter disk comprises an annular portion covering said at least one second through-hole and having said first through-hole formed in said annular portion, said shutter portion being a sector projecting radially outwardly from the periphery of said annular portion.

7. An apparatus for detecting torque according to claim 1, wherein said detectable portions on said wheel disk are formed so that the space between consecutive portions exponentially increases.

8. An apparatus for detecting torque according to claim 1, wherein said processing means further comprises:

setting means for setting the number of said detectable portions corresponding to a predetermined upper limit torque;

a comparator for comparing a number counted by said counter with the number set by said setting means and generating a warning signal when said counted number exceeds said set number; and means for warning an operator upon generation of said warning signal.

9. An apparatus for detecting torque according to claim 1, wherein said processing means further comprises:

setting means for setting a number of said detectable portions corresponding to a predetermined lower limit torque;

a comparator for comparing a number counted by said counter with the number set by said setting means and for generating a warning signal when said counted number falls below said set number; and means for warning an operator upon generation of said warning signal.

10. An apparatus for detecting torque according to claim 1, wherein said processing means further comprises:

arithmetic means for calculating load torque applied to said driven member, on the basis of an increment in the number of said detecting signals from that obtained in unloaded state; and means for indicating the calculated load torque.

11. An apparatus for detecting torque according to claim 1, wherein said driven member comprises a sleeve in which a driven shaft is fitted axially slidably but relatively unrotatably.

12. An apparatus for detecting torque according to claim 1, wherein said plurality of detectable portions are disposed along substantially half the circumference of said circle, and said shutter portion has end lines which are opposite to each other diametrically of said wheel disk circle.

13. An apparatus for detecting torque according to claim 1, wherein said wheel and shutter disks are positioned by said transmitting means such that a predetermined number of said detectable portions are exposed with respect to said shutter portion even when no load is applied to said driven rotary member.

14. An apparatus for detecting relative angular displacement in a range less than 360 degrees between a first rotary member and a second rotary member which are mounted on a frame and rotate about a common axis, comprising:

a wheel disk attached to said first rotary member and having a plurality of detectable portions spaced from each other along a circle concentric with said axis;

first detecting means, disposed on said frame adjacent to said disk, for detecting said detectable portions of said wheel disk and generating detecting signals when said detectable portions are detected during rotation of said first rotary member;

a shutter disk attached to said second rotary member adjacent to said wheel disk and having a single shutter portion formed thereon so as to cover a partial circumference of said circle, said shutter portion selectively covering consecutive ones of said detectable portions and thereby preventing said first detecting means from detecting the consecutive detectable portions covered by the shutter portion, one circumferential end of said shutter portion being movable relative to a specific one of said detectable portions in response to said relative angular displacement and thereby changing the number of the detectable portions which are exposed with respect to said shutter portion to be detected by said first detecting means; and second detecting means, disposed on said frame adjacent to said wheel and shutter disks, for detecting a resetting portion formed in one of said wheel and shutter disks, said second detecting means generating a resetting signal in each rotation of said wheel and shutter disks when said resetting portion is detected; and processing means, connected to said first and second detecting means, comprising a counter for counting the number of said detecting signals generated by said first detecting means, said counter being reset by said resetting signal, whereby said relative angular displacement is detected in each rotation of said rotary members.

* * * * *